Patented Aug. 22, 1939

2,170,002

UNITED STATES PATENT OFFICE 2,170,002

PROCESS OF MAKING ACETIC ANHYDRIDE

Gwyn Benson, Shawinigan Falls, Quebec, Canada, assignor to Shawinigan Chemicals Limited, Montreal, Quebec, Canada, a corporation of Canada No Drawing. Application May 16, 1936, Serial No. 80,167. In Great Britain May 18, 1935

11 Claims. (Cl. 260—546)

This invention relates to the production of the anhydrides of monobasic and saturated and unsaturated polybasic aliphatic and aromatic acids and the anhydrides of the corresponding substituted acids by oxidation of the corresponding aldehydes and relates particularly to the production of acetic anhydride by oxidation of acetaldehyde.

It has been discovered that when producing acetic acid by oxidation of acetaldehyde with air or oxygen, acetic anhydride and water are produced as intermediate products and that the anhydride is hydrolyzed to acetic acid. The hydrolysis takes place very readily under the temperature, pressure and oxygen input conditions usual in the production of acetic acid but by suitable regulation of these and by the use of efficient catalysts and rapid cooling a portion of the formed anhydride may be separated before it is hydrolyzed.

It has been discovered that the concentration of acetic acid in the reaction mixture has considerable influence on the rate of hydrolysis of anhydride relatively to the rate of oxidation of the aldehyde to anhydride, high concentrations of acetic acid operating to increase the aforesaid relative rate of hydrolysis of anhydride. Thus, the yield of anhydride when the aldehyde is completely oxidized may be actually less than the yield of anhydride when, say, only 70% of the aldehyde has been oxidized.

According to the present invention, which for the sake of simplicity is described in connection with the production of acetic anhydride, acetaldehyde is oxidized with air or oxygen, or a mixture of air or oxygen, in presence of an oxidation catalyst and a diluent with production of acetic anhydride, water and acetic acid and when the reaction has proceeded to a desired extent, preferably to substantially complete oxidation of the aldehyde, the reaction mixture is cooled quickly to check hydrolysis of the acetic anhydride and the anhydride is separated from the other constituents of the reaction mixture, preferably by distillation under subatmospheric pressure. Alternatively, the reaction mixture may be contacted with a dehydrating agent and, after removal of the water, distilled for separation of the other constituents.

The maximum yields of anhydride are obtained by carrying out the reaction as quickly as possible and at temperature relatively low as compared with optimum temperatures for acetic acid production and by use of certain catalysts.

A high speed of reaction is obtained by operating under pressure as high as is consistent with safety, economy and efficient cooling thereby to permit of a high rate of oxygen input and by supplying the air at a high rate up to that at which the oxygen input is equal to or nearly equal to the maximum rate at which oxygen can be absorbed at the pressure and temperature of the reaction. Pressures between 50 and 100 lbs. per square inch superatmospheric have been found suitable but higher pressures may be used.

Relatively low temperature depresses the rate of hydrolysis of the acetic anhydride while high pressure and high oxygen input expedite the reaction so that the period of time during which the anhydride and water are in contact is as short as possible and the loss of anhydride by hydrolysis is thereby minimized. Temperatures between 40° and 70° C. have been found satisfactory.

The catalysts used may be any of those known in the production of acetic acid by oxidation of acetaldehyde but best results so far as is known now are obtained by use of a double catalyst which may be an acetate of manganese or of any of the metals the salts of which are known as catalysts in the production of acetic acid by oxidation of acetaldehyde together with an acetate of copper or nickel or cobalt with or without one or more of the following, namely, an acetate of copper, nickel, cobalt, tin, lead, cerium, vanadium, uranium or of any of the metals the salts of which are known as catalysts in the production of acetic acid by oxidation of acetaldehyde. Instead of acetates one may use certain other salts of the metals above specified such as the propionates or butyrates.

Precautions should be taken to minimize the amount of free water present in the reaction so as to minimize the loss of anhydride by hydrolysis, these precautions being for example the use of an anhydrous catalyst, the drying of air supplied and possibly the taking up of water liberated in or introduced into the reaction, by means of a dehydrating agent such as anhydrous calcium sulphate, or a combination of these.

The diluent serves to keep the concentration of the acid below a predetermined percentage, the diluent being, for the purposes of this invention, necessarily one which does not favour hydrolysis of the anhydride. For practical considerations it is necessary that the diluent be readily separable from the other constituents of the final reaction mixture and be readily recoverable.

Suitable diluents are esters or hydrocarbons liquid at ordinary temperatures which are not readily autoxidizable or quickly hydrolyzable or hydrolyzable to give a mineral acid and in presence of which organic acid anhydrides hydrolyze more slowly than in presence of the corresponding organic acids.

Examples of suitable diluents are:—Ethyl acetate, ethylidene diacetate, methyl acetate, and a phthalate such as dibutyl phthalate. One or more of the foregoing or of other bodies having the desired effect is or are admixed with the acetaldehyde at the outset of or during the progress of the reaction.

In the earlier stages of the reaction, that is up to the time when the maximum concentration of anhydride is attained, the aldehyde itself serves to keep the concentration of acid sufficiently low and the reaction could be stopped here were it not for the difficulty of recovering the aldehyde. It is therefore advisable to obtain a maximum conversion of aldehyde and this may be done according to the present invention without material loss of anhydride, by using a diluent.

The concentration of acid which may be present without seriously affecting the yield of anhydride depends somewhat upon the temperature, pressure and catalyst used and is best kept below 60%, but may under certain conditions be between 60% and 75%.

When relatively large amounts of diluent are used, not only is the loss of produced anhydride during the later stages of the reaction minimized but the maximum concentration of anhydride in the reaction mixture is greater than when relatively small amounts of diluent or no diluent at all is used and the maximum concentration of anhydride is not attained until the oxidation of the aldehyde has proceeded more nearly to completion. Moreover, when using diluents, the importance of a high rate of oxidation is less than when diluents are not used.

The manner of operation now preferred is to pass a suitable oxidizing agent, such as air, into a mixture of acetaldehyde and a diluent in presence of a catalyst being a mixture of at least two of the following namely, the acetates of manganese, copper, nickel and cobalt under pressure between 50 and 100 lbs. per square inch superatmospheric and with cooling to maintain a temperature between 40° and 70° C. and preferably between 45° and 50° C., the air being supplied at a rate up to that at which the oxygen input is equal to or nearly equal to the maximum rate at which oxygen can be absorbed at the pressure and temperature of the reaction and the nitrogen residue of the air being discharged continuously from the reaction vessel. It is important to avoid supplying air at a rate in excess of that at which substantially all the oxygen is absorbed so as to avoid the presence of mixtures of acetaldehyde vapour and oxygen which are liable to explode especially at high pressures. The maximum concentration of acetic anhydride in the reaction mixture is obtained when the acetaldehyde is above 70% converted and falls off gradually thereafter as the reaction is continued. The reaction is preferably continued to substantially complete conversion of the acetaldehyde and the reaction is then stopped by cutting off the air supply and cooling the mixture as rapidly as possible to 20° C. or lower, depending upon how soon the water can be separated out. The mixture is preferably subjected to vacuum distillation primarily for removal of water quickly and at low temperature so as to minimize loss of anhydride by hydrolysis and also for separation of the unconverted acetaldehyde, the acetic acid and the acetic anhydride. Alternatively, the reaction mixture may be dehydrated by contact with a suitable dehydrating agent and residue fractionated at atmospheric pressure.

The process may be conducted as a batch process or may be conducted as a continuous process by drawing off reaction mixture and adding acetaldehyde, diluent, catalyst and dehydrating agent, if any be used, either continuously or intermittently at such rate that the percentage total acidity in the reaction remains at approximately a selected figure, say 70%. The acetaldehyde separated from the drawn off mixture may be recycled.

The following examples illustrate the foregoing but it is to be understood the invention is not limited to the diluents, proportions, catalysts, pressures, temperatures or rates of oxidation of the examples, but extends to all useful diluents, proportions, catalysts, pressures, temperatures and rates of oxidation.

Example I

A mixture of 20 parts ethyl acetate and 80 parts acetaldehyde by weight containing approximately 0.04 part manganous acetate and 0.10 part copper acetate which oxidizes in the reaction to a higher valent oxide as catalyst was oxidized under pressure of 65 lbs. per square inch superatmospheric, with air, the reaction being cooled to maintain a temperature of approximately 50° C. and the air being supplied at a rate nearly up to the maximum rate of oxygen absorption therefrom at the pressure and temperature of the reaction. When 80% of the acetaldehyde was oxidized the acetic anhydride was 13.5% of the reaction mixture. On continuing the oxidation until 98.9% of the aldehyde was oxidized, the acetic anhydride was 13.3% of the mixture or equivalent to 18.4% of the aldehyde oxidized.

By comparison, when acetaldehyde was oxidized under the same conditions excepting that the ethyl acetate was omitted, the acetic anhydride was 16.6% of the mixture when the acetaldehyde was 80% oxidized but the percentage dropped to 13% of the mixture when the aldehyde was 92% oxidized, and when 99% of the aldehyde was oxidized the percentage of anhydride dropped to 8.1% equivalent to 9.6% of the aldehyde oxidized.

Example II

A mixture of 30 parts ethyl acetate and 70 parts acetaldehyde was oxidized as before until only 1.5% of the aldehyde remained unchanged. The percentage of acetic anhydride in the mixture was 14.0% equivalent to 18.6% of the oxidation products or 22% of the aldehyde oxidized.

Example III

The process of Example I was repeated using ethylidene diacetate as diluent in place of ethyl acetate. At completion of the reaction, 19.4% of the aldehyde oxidized was obtained as anhydride.

Example IV

A mixture of 40 parts by weight of ethyl acetate and 60 parts of acetaldehyde, using as catalyst 0.1 part copper acetate and 0.05 part cobalt acetate, was oxidized with air supplied at the rate of 0.3 part by weight per minute while maintaining a temperature of approximately 50° C.

and a pressure of 60 lbs. per square inch superatmospheric.

When 80% of the aldehyde had been oxidized, 57% of the aldehyde oxidized was present as acetic anhydride. When 92.2% of the aldehyde had been oxidized, 44.7% of the aldehyde oxidized was present as anhydride.

Example V

A mixture of 60 parts of ethyl acetate and 40 parts of acetaldehyde, by weight, was oxidized as in Example IV.

When 80% of the aldehyde was oxidized, 64% of the aldehyde oxidized was present as acetic anhydride and when 99% of the aldehyde was oxidized, 52.9% of the aldehyde oxidized was present as acetic anhydride.

Example VI

A mixture of 70 parts of ethyl acetate and 30 parts acetaldehyde, by weight, was oxidized as in Example IV.

When 80% of the aldehyde was oxidized, 68.5% of the aldehyde oxidized was present as anhydride and when 99.6% of the aldehyde was oxidized, 57.4% of the aldehyde oxidized was present as anhydride.

Example VII

A mixture of 50 parts ethyl acetate and 50 parts acetaldehyde was continuously passed into a reaction vessel and oxidized by a stream of air, the reaction mixture being drawn off continuously. The catalyst concentration was kept at 0.1% copper acetate and 0.05% cobalt acetate. The liquid drawn off contained 19.7% acetic anhydride and a total acidity of 43.4% expressed as acetic acid. This is equal to a yield of anhydride of 52% on the aldehyde oxidized.

By comparison, when no ethyl acetate was used and the rate of oxidation and the percentage aldehyde in the draw off were the same as above, the draw off had a composition of 16.5% anhydride and a total acidity of 80%. The yield of anhydride was thus only 24% on the aldehyde oxidized, namely, less than half that obtained using an ethyl acetate diluent as above.

From comparison of the foregoing examples it will be seen that by use of moderate amounts of diluent the drop in the percentage of anhydride in the final product, which occurs when the oxidation of the aldehyde is carried nearly to completion, is much reduced as compared with the drop when no diluent is used. It will also be seen that use of large amounts of diluent enables considerably more than half of the aldehyde oxidized to be obtained as anhydride.

In the final distillation of the reaction mixture for separation of the reaction products and unconverted aldehyde, ethyl acetate aids in removal of water and thus reduces the loss of acetic anhydride by hydrolysis.

Proceeding in general as herein described, the anhydrides of monobasic or saturated or unsaturated polybasic aliphatic or aromatic acids and the anhydrides of the corresponding substituted acids may be prepared from the corresponding aldehydes.

In the following claims, except where the context indicates otherwise, the term "oxygen" is used without limitation to pure or substantially pure oxygen and is to be interpreted as including dilutions thereof, particularly air.

It is to be particularly understood that the present invention, which is essentially the production of anhydrides of organic acids by oxidation of the corresponding aldehydes in presence of a diluent, is not limited to the catalysts, temperatures, pressures and rates of oxygen input herein disclosed for purposes of explanation, but extends to processes involving other catalysts, temperatures, pressures or modes of treatment.

The term "diluent" is herein used in its strict sense, that is, as indicating a body inert in the reaction, as excluding any reactant and as excluding any product of the reaction and any substance of the same chemical composition as such product.

Having thus described by invention what I claim is:

1. A process of obtaining the anhydrides of monobasic and saturated and unsaturated polybasic aliphatic and aromatic acids and the anhydrides of the corresponding substituted acids, which comprises passing oxygen into the aldehyde corresponding to the desired anhydride in presence of an oxidation catalyst and a diluent for the reaction products, which diluent depresses the rate of hydrolysis of the anhydride below the rate when in the presence of the corresponding acid and is readily separated from other constituents of the reaction mixture and readily recoverable and separating the anhydride from the reaction mixture.

2. A process of obtaining the anhydride of an organic aliphatic acid, which comprises passing oxygen into the corresponding aldehyde in presence of an oxidation catalyst and an inert ester containing only carbon, hydrogen and oxygen, as diluent and separating the produced anhydride from the reaction mixture.

3. A process of obtaining acetic anhydride which comprises passing oxygen into acetaldehyde in presence of an oxidation catalyst and a diluent, which diluent depresses the rate of hydrolysis of the anhydride below the rate when in presence of the corresponding acid and is readily separated from other constituents of the reaction mixture and readily recoverable and separating the produced anhydride from the reaction mixture.

4. A process of obtaining acetic anhydride which comprises passing oxygen into acetaldehyde in presence of an oxidation catalyst and a diluent selected from the group consisting of ethyl acetate, ethylidene diacetate, methyl acetate and dibutyl phthalate, which diluent depresses the rate of hydrolysis of the anhydride and is readily separated from other constituents of the reaction mixture and readily recoverable, and separating the produced anhydride from the reaction mixture.

5. A process according to claim 3 in which the diluent is present in amount sufficient to hold the concentration of produced acetic acid in the reaction mixture below 15%.

6. A process according to claim 3 in which the diluent is used in proportion of from one-quarter to two and one-third parts of diluent to each part of acetaldehyde.

7. A process according to claim 1 conducted in a continuous manner by adding diluent and aldehyde to the reaction during progress thereof and withdrawing reaction mixture.

8. A process according to claim 3 conducted in a continuous manner by adding diluent and acetaldehyde to the reaction during progress thereof and withdrawing reaction mixture.

9. A process of obtaining acetic anhydride which comprises passing oxygen into acetaldehyde in presence of an inert ester as diluent and an oxidation catalyst while maintaining a temperature sufficiently low so that acetic anhydride hydrolyzes at a rate below the rate of its formation, with production of acetic anhydride and water; and, when a selected degree of oxidation has taken place, cooling the reaction mixture quickly to a temperature at which hydrolysis of the acetic anhydride is materially retarded and separating the water and anhydride from each other and from the other components of the reaction mixture.

10. A process of obtaining acetic anhydride which comprises passing oxygen into acetaldehyde in presence of an inert ester as diluent and an oxidation catalyst while maintaining a temperature between 40° and 70° C. and when a selected degree of oxidation has taken place cooling the reaction mixture quickly to a temperature at which hydrolysis of the acetic anhydride is materially retarded and separating the water and anhydride from each other and from the other components of the reaction mixture.

11. A process of obtaining acetic anhyride which comprises passing oxygen into acetaldehyde in presence of an inert ester as diluent and an oxidation catalyst under pressure between 50 and 100 lbs. per square inch superatmospheric while maintaining a temperature between 40° and 70° C., and when a selected degree of oxidation has taken place, cooling the reaction mixture quickly to a temperature at which hydrolysis of the acetic anhydride is materially retarded and separating the water and anhydride from each other and from the other components of the reaction mixture.

GWYN BENSON.

CERTIFICATE OF CORRECTION.

Patent No. 2,170,002. August 22, 1939.

GWYN BENSON.

It is hereby certified that error appears in the printed specification of the above numbered patent requiring correction as follows: Page 3, second column, line 13, for the word "by" read my; line 60, claim 5, for "15%" read 75%; and that the said Letters Patent should be read with this correction therein that the same may conform to the record of the case in the Patent Office.

Signed and sealed this 24th day of October, A. D. 1939.

(Seal)
Henry Van Arsdale,
Acting Commissioner of Patents.

CERTIFICATE OF CORRECTION.

Patent No. 2,170,002. August 22, 1939.

GWYN BENSON.

It is hereby certified that error appears in the printed specification of the above numbered patent requiring correction as follows: Page 2, second column, lines 28 and 29, Example 1, strike out the words "which oxidizes in the reaction to a higher valent oxide" and insert the same after "acetate" in line 27; and that the said Letters Patent should be read with this correction therein that the same may conform to the record of the case in the Patent Office.

Signed and sealed this 19th day of December, A. D. 1939.

(Seal)
Henry Van Arsdale,
Acting Commissioner of Patents.

an oxidation catalyst while maintaining a temperature sufficiently low so that acetic anhydride hydrolyzes at a rate below the rate of its formation, with production of acetic anhydride and water; and, when a selected degree of oxidation has taken place, cooling the reaction mixture quickly to a temperature at which hydrolysis of the acetic anhydride is materially retarded and separating the water and anhydride from each other and from the other components of the reaction mixture.

10. A process of obtaining acetic anhydride which comprises passing oxygen into acetaldehyde in presence of an inert ester as diluent and an oxidation catalyst while maintaining a temperature between 40° and 70° C. and when a selected degree of oxidation has taken place cooling the reaction mixture quickly to a temperature at which hydrolysis of the acetic anhydride is materially retarded and separating the water and anhydride from each other and from the other components of the reaction mixture.

11. A process of obtaining acetic anhyride which comprises passing oxygen into acetaldehyde in presence of an inert ester as diluent and an oxidation catalyst under pressure between 50 and 100 lbs. per square inch superatmospheric while maintaining a temperature between 40° and 70° C., and when a selected degree of oxidation has taken place, cooling the reaction mixture quickly to a temperature at which hydrolysis of the acetic anhydride is materially retarded and separating the water and anhydride from each other and from the other components of the reaction mixture.

GWYN BENSON.

---

CERTIFICATE OF CORRECTION.

Patent No. 2,170,002.   August 22, 1939.

GWYN BENSON.

It is hereby certified that error appears in the printed specification of the above numbered patent requiring correction as follows: Page 3, second column, line 13, for the word "by" read my; line 60, claim 5, for "15%" read 75%; and that the said Letters Patent should be read with this correction therein that the same may conform to the record of the case in the Patent Office.

Signed and sealed this 24th day of October, A. D. 1939.

(Seal)   Henry Van Arsdale,
Acting Commissioner of Patents.

---

CERTIFICATE OF CORRECTION.

Patent No. 2,170,002.   August 22, 1939.

GWYN BENSON.

It is hereby certified that error appears in the printed specification of the above numbered patent requiring correction as follows: Page 2, second column, lines 28 and 29, Example 1, strike out the words "which oxidizes in the reaction to a higher valent oxide" and insert the same after "acetate" in line 27; and that the said Letters Patent should be read with this correction therein that the same may conform to the record of the case in the Patent Office.

Signed and sealed this 19th day of December, A. D. 1939.

(Seal)   Henry Van Arsdale,
Acting Commissioner of Patents.

CERTIFICATE OF CORRECTION.

Patent No. 2,170,002.                                August 22, 1939.

GWYN BENSON.

It is hereby certified that error appears in the printed specification of the above numbered patent requiring correction as follows: Page 2, second column, lines 28 and 29, Example 1, strike out the words "which oxidizes in the reaction to a higher valent oxide" and insert the same after "acetate" in line 27; and that the said Letters Patent should be read with this correction therein that the same may conform to the record of the case in the Patent Office.

Signed and sealed this 19th day of December, A. D. 1939.

(Seal)

Henry Van Arsdale,
Acting Commissioner of Patents.